United States Patent
Yao et al.

(10) Patent No.: US 7,685,041 B1
(45) Date of Patent: Mar. 23, 2010

(54) SPIKE FILTER FOR FINANCIAL DATA REPRESENTED AS DISCRETE-VALUED TIME SERIES

(75) Inventors: Hongyu Yao, Sunnyvale, CA (US); Amol Kekre, Fremont, CA (US); Michael Bennett, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1149 days.

(21) Appl. No.: 10/935,865

(22) Filed: Sep. 8, 2004

(51) Int. Cl.
*G06Q 40/00* (2006.01)
(52) U.S. Cl. ....................................................... 705/35
(58) Field of Classification Search .................. 705/35, 705/37
See application file for complete search history.

(56) References Cited

U.S. PATENT DOCUMENTS

2002/0156717 A1* 10/2002 Delta et al. .................... 705/37
2004/0193527 A1* 9/2004 Kelly et al. .................... 705/37

* cited by examiner

*Primary Examiner*—Hani Kazimi
*Assistant Examiner*—Samica L Norman
(74) *Attorney, Agent, or Firm*—Morrison & Foerster LLP (57) ABSTRACT

A method of filtering real-time financial data to provide accurate data to users is provided. The method includes comparing the trading price of a currently reported stock trade with the trading price of a previously reported stock trade and identifies the currently reported stock trade as a potential bad trade if the percentage difference between the two is greater than a reference percentage. The real-time spike filter confirms the currently reported stock trade as a bad trade based on: (i) a comparison of the trading prices of the currently reported stock trade and a next reported stock trade; and (ii) a comparison of the trading prices of the previously reported stock trade and the next reported stock trade.

19 Claims, 4 Drawing Sheets

```
Hello, User

Set Stock Alerts

Stock Symbol:  | ABCD  |
    When price falls to: | 20.00 |
    When price rises to: | 40.00 |
    Percent decrease is: |       |
    Percent increase is: |       |

[ SUBMIT ]
```

FIG. 3B

Welcome, User

E-mail: Inbox

| Sender | Subject | Date | Size |
|---|---|---|---|
| Friend | Hello | 7/1/04 | 2k |
| Yahoo!® Finance | Stock ABCD traded at 150.00 at 9:35:00 AM | 7/2/04 | 2k |

FIG. 4

SPIKE FILTER FOR FINANCIAL DATA REPRESENTED AS DISCRETE-VALUED TIME SERIES

BACKGROUND OF THE INVENTION

1. Field of the Invention

The present invention relates generally to financial data processing, and more particularly, to a filtering method that is applied to financial data represented as a discrete-valued time series.

2. Description of the Related Art

With the use of electronic trading platforms by stock exchanges, the likelihood of 'bad' stock trades being reported (i.e. stock trades that are reported but did not actually take place) has increased. The bad stock trades may be the result of data entry errors or computer software bugs.

Eventually, the bad stock trades are detected and removed from the stock trade data that are reported, but this is typically not done in real-time or near real-time. There have been attempts to identify bad trades in real-time or near real-time by examining whether the percentage difference between two consecutive trading prices exceeds a fixed predefined percentage and filtering the latter trade as a bad trade if it does. Other methods identify any trade that is outside the range of the then-current bid and ask prices as a bad trade. These methods, however, are overly aggressive and tend to filter a large number of good trades along with the bad trades.

SUMMARY OF THE INVENTION

The invention provides a bad trade filter that is more accurate than the methods used in the current art. With the bad trade filter according to the invention, price spikes that are likely to be associated with bad stock trades are identified and excluded from the stock trade data presented to users.

In the preferred embodiment, the invention is applied to a continuous stream of discrete values representing stock prices reported in real-time. The current trading price data is identified as a potential spike if the percentage difference between the current trading price and the immediately prior (reference) trading price is greater than a reference percentage that is determined based on the reference trading price, current trading volume, and the average daily volume of the stock being traded.

The potential spike is confirmed as a spike, and the stock trade associated with the potential spike is confirmed as a bad trade, based on future trade data, i.e., the trading price and volume of the next reported trade. More specifically, the potential spike is confirmed as a spike if the following two conditions are true: (1) if the percentage difference between the next trading price and the reference trading price is not greater than a reference percentage that is determined based on the reference trading price, next trading volume, and the average daily volume of the stock being traded, and (2) the percentage difference between the next trading price and the current trading price is greater than the reference percentage that is determined based on the reference trading price, current trading volume, and the average daily volume of the stock being traded.

If the current trading price is confirmed as a spike based on the future trade data, the current trading price is not included in the stock trade data presented to the users and the next trading price is then examined for a spike in the same manner the current trading price was examined. If the current trading price is not confirmed as a spike based on the future trade data, the current trading price is included in the stock trade data presented to users and the current trading price becomes the reference trading price. In addition, the next trading price becomes the current trading price and is examined for a spike in the same manner the previous current trading price was examined.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The inventors observed that most of the bad trades are represented as spikes in an otherwise 'smooth' discrete-valued time series of stock trading prices. Thus, the inventors sought to find a solution to filter out the spikes and thereby provide more reliable stock price information to users. In designing this bad trade filter, the inventors analyzed trading trends in different stock exchanges and made the following observations:

1. The trading price of a stock normally changes smoothly.

2. Trading prices of stock trades are sometimes not synchronized with their associated bid and ask prices when they are reported; and, as a result, the reported trading prices sometimes lie outside the range defined by the reported bid and ask prices.

3. Many trading trends, in particular the percentage variations in trading prices, of different stock exchanges are different.

4. The following trends are common among the different stock exchanges:

the higher the trading price, the lower the percentage change in price between two consecutive trades;

the higher the trading volume, the lower the percentage change in price between two consecutive trades; and     the higher the average daily trading volume, the lower the percentage change in price between two consecutive trades.

In addition, the inventors observed that designing a bad trade filter based on only two consecutive trades may not be sufficient. For instance, the inventors recognized that large jumps or drops in stock prices may be associated with significant market news (e.g., interest rate adjustments by the Federal Reserve) or significant news surrounding the particular stock being examined (e.g., an earnings announcement).

To account for these types of trading dynamics, the inventors used a bad trade filter that evaluates past trade data, as well as future trade data, to determine if the current trade data is reliable or not.

Figure 1:
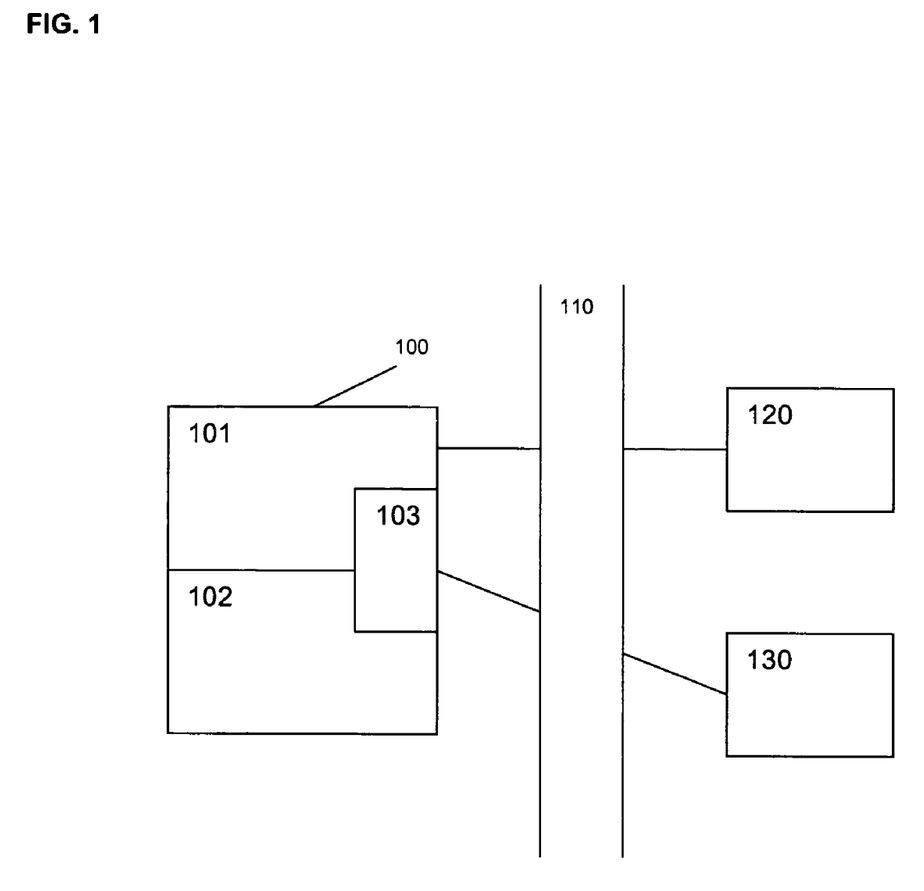
FIG. 1 is a block diagram of a system implementing a spike filter.

FIG. 1 is a block diagram of a system implementing a spike filtering method according to the invention. As shown, FIG. 1 illustrates a computer system 100. The components of the computer system 100 that carry out data processing operations under the control of software are illustrated in FIG. 1 as data processing sections 101, 102, 103. The operations of the data processing sections 101, 102, 103 may be carried out with a single processor or multiple processors. A first data processing section 101 is programmed to communicate with one or more third party services 120 that supply (1) real-time financial data associated with securities transactions, including information for identifying the security (e.g., the security's ticker symbol), the date and time the security transaction took place, the number of shares traded, and the trading price, and (2) average daily volume data, including information for identifying the securities covered, dates for which the average daily volume data are relevant, and the average daily volume figures for the covered securities on the relevant dates. A second data processing section 102 is programmed to communicate with the first data processing section 101 and to filter out spikes in the financial data supplied by the service 120. A third data processing section 103 is programmed to communicate with the first and second processing sections 101, 102 and as a web application server so that remote computers 130 can access the web services provided by the computer system 100 over the Internet 110.

Yahoo!® Finance is an example of a web service provided by the computer system 100 that users may access over the Internet 110. Yahoo!® Finance provides access to a wide array of financial resources and tools, including quotes service (from most major stock exchanges around the world), personal portfolio tracking (including e-mail alerts when current stock price exceeds or dips below a user-specified price), and historical price data charts. Yahoo!® Finance also provides financial news and editorial content directed to various investment topics.

Figure 2A:
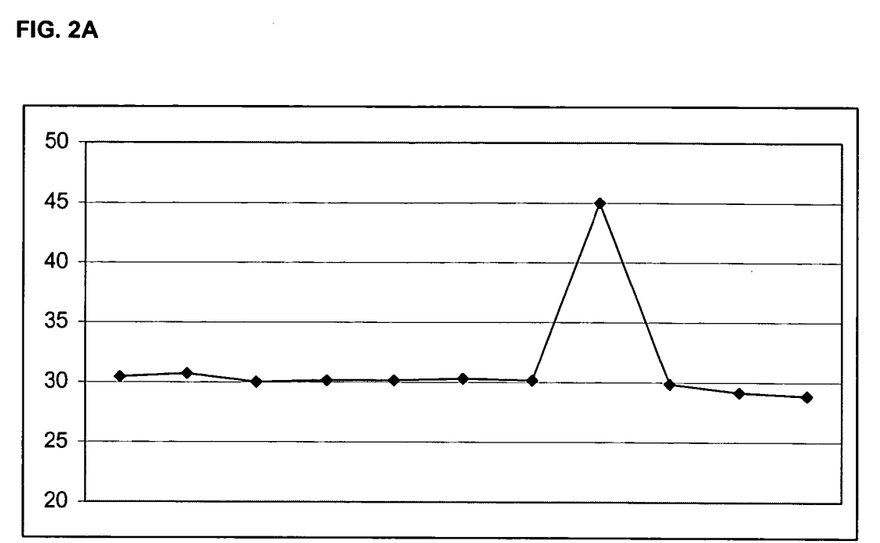
FIG. 2A is a graph showing a discrete-valued time series having a spike.
Figure 2B:
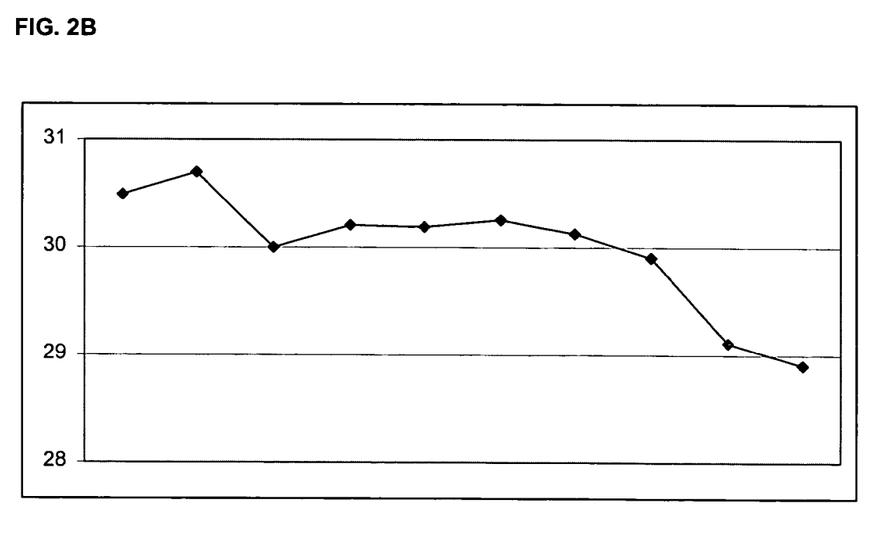
FIG. 2B is a graph showing the discrete-valued time series of FIG. 2A with the spike removed in accordance with the invention.

It is important to filter out bad trades that are sometimes reported by the third party service 120 so that accurate trading data is reported to users of a web service like Yahoo!® Finance. Otherwise, the bad trade may affect how a stock is charted. For example, a large spike in the price data may enlarge the scaling of a stock's historical price data and cause the related price data chart to show a substantially straight line except for the spike. FIG. 2A illustrates a stock chart with the large spike. FIG. 2B illustrates a stock chart with the large spike filtered in accordance with the invention.

Figure 3A:
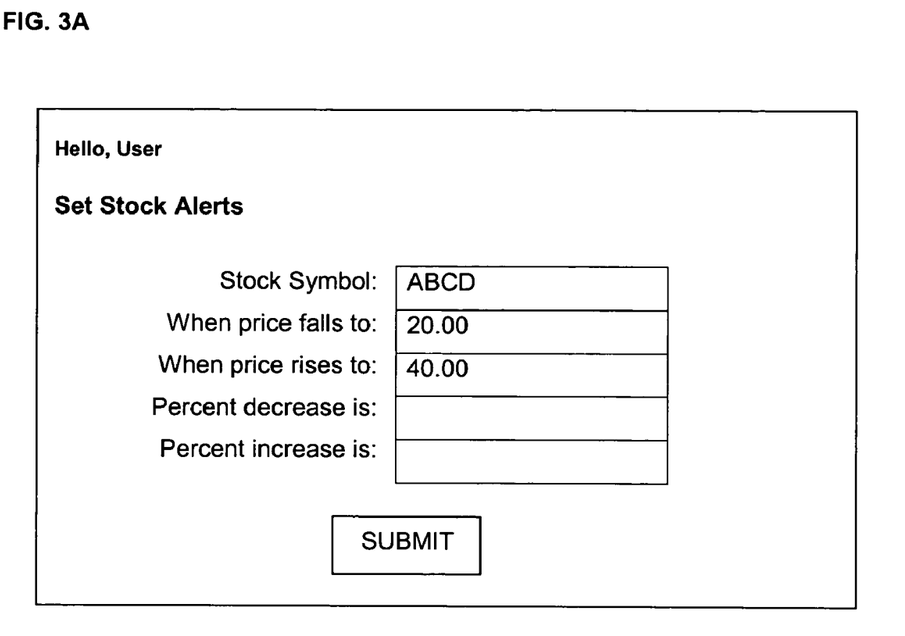
FIG. 3A is a sample user interface with which a user can specify when e-mail alerts are to be issued.
Figure 3B:
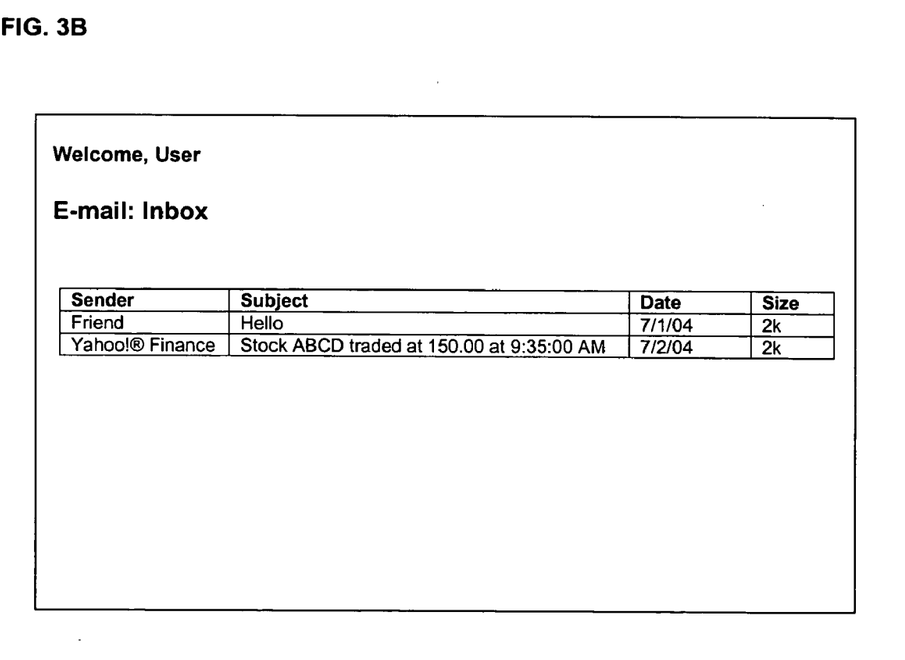
FIG. 3B is a sample inbox of an e-mail account showing an e-mail alert that has been issued.

Bad trades also may cause e-mail alerts to be improperly issued. FIG. 3A illustrates a user interface with which the user of the computer system 100 can specify e-mail alerts to be issued when the price of a stock exceeds a certain price or dips below a certain price. In FIG. 3A, the user inputs indicate that the user wants to be notified by e-mail when the trading price of stock ABCD falls below $20.00 or rises above $40.00. FIG. 3B illustrates an e-mail alert that the user might receive in the inbox of his or her e-mail account. If large spikes in the price data that are associated with bad trades are not filtered, the large spikes may cause false e-mail alerts and unnecessarily alarm the user.

Figure 4:
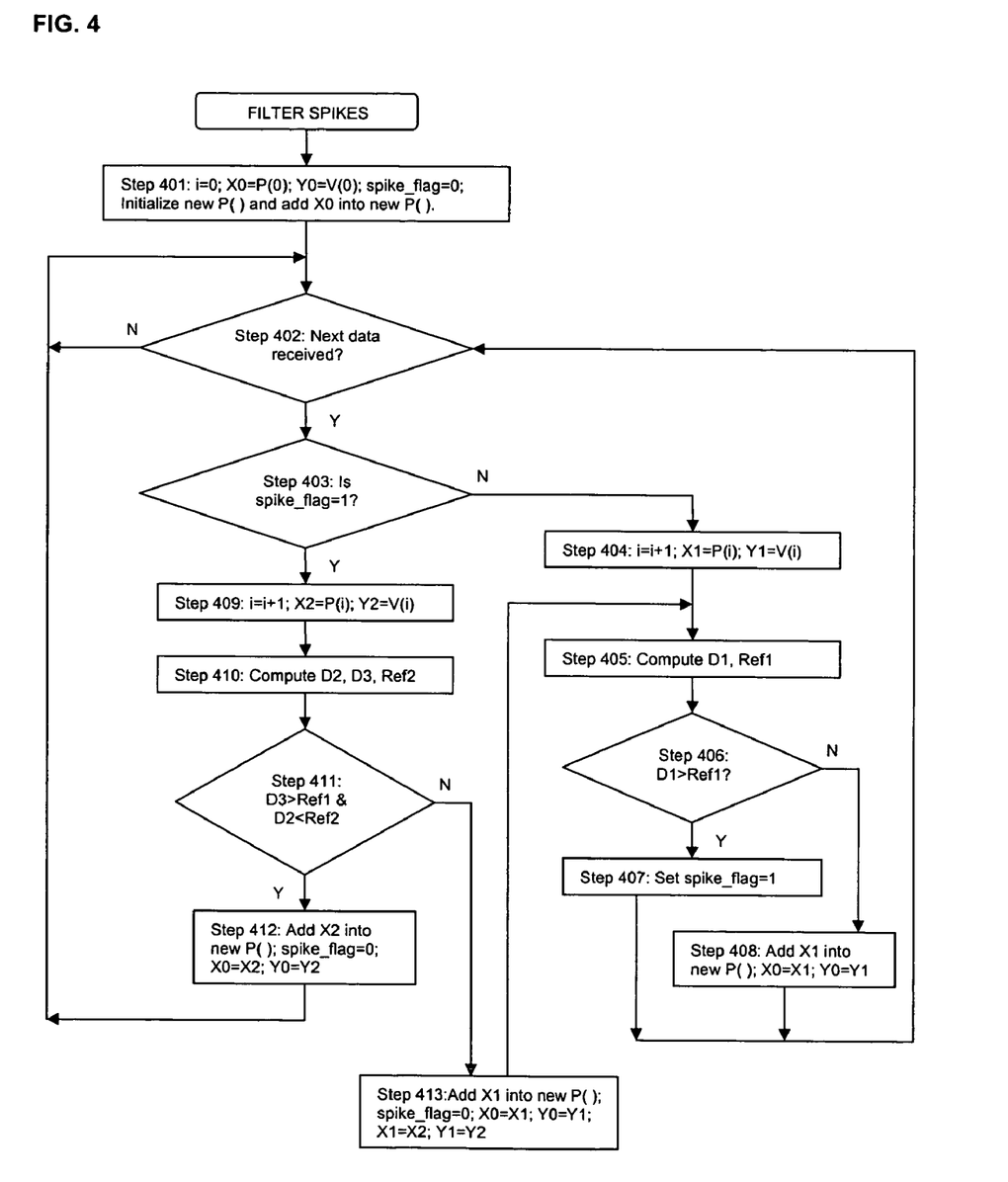
FIG. 4 is a flow diagram of a spike filter according to an embodiment of the invention.

FIG. 4 is a flow diagram executed by the second processing section 102 of the computer system 100 of FIG. 1 to provide spike filtering of a discrete-valued time series of stock trade data that are reported by the third party service 120. In the preferred embodiment, the spike filter is executed at the beginning of each trading day for each stock that is tracked by the computer system 100 of FIG. 1, and is continuously run throughout the trading day so that spikes in reported trades can be filtered in real-time or near real-time. In this manner, stock prices that are charted during the trading day will not include the bad trades that are filtered by the spike filter. Also, any stock alert that would have been based on the bad trades is suppressed.

The flow diagram of FIG. 4 will now be described in connection with the filtering of spikes in the trading prices of stock ABCD. In Step 401, the price and volume data associated with the first executed trade are stored in X0 and Y0, and the spike_flag variable is set to zero. Also, the array new P( ), in which filtered price data points will be stored for delivery in real-time or near real-time to users of the service provided by the computer system 100, is initialized. The opening price for the stock, X0, is stored as the first element of the array new P( ). When next trade data is received (Step 402), the spike_flag variable is checked (Step 403). If spike_flag is not equal to 1 (this means that there is no potential price spike to be confirmed), the current trade data, X1 and Y1, are read (Step 404). In Step 405, D1 and Ref1 are computed, where:

D1=abs(X1−X0)/X0, representing the percent change in stock price from X0 to X1 with respect to X0;

Ref1 represents the reference percentage change of D1;

X0=stock price of the reference trade; and

X1=stock price of the current trade.

In Step 406, D1 is compared against Ref1. If D1 is greater than Ref1 (i.e., if the percent change in price between the current trade and the reference trade is greater than a maximum allowable percentage), the spike_flag variable is set to one (indicating that the current trading price is a potential price spike) (Step 407) and flow returns to Step 402. If D1 is not greater than Ref1 (i.e., if the percent change in price between the current trade and the reference trade is within the maximum allowable percentage), then it is determined that X1 is not associated with a price spike and X1 is added into the array new P( ) (Step 408). Also in Step 408, X1 and Y1 are stored as X0 and Y0 so that when flow returns to Step 402, X1 will be the new reference trading price.

If spike_flag is equal to 1 (this means that the current trading price has been determined as a potential price spike), Steps 409-411 will be carried out to confirm whether the current trading price is a price spike. In Step 409, the next trade data, X2 and Y2, are read. In Step 410, D2, D3 and Ref2 are computed, where:

D2=abs(X2−X0)/X0, representing the percent change in stock price from X0 to X2 with respect to X0;

D3=abs(X2−X1)/X0, representing the percent change in stock price from X1 to X2 with respect to X0;

X0=stock price of the reference trade;

X1=stock price of the current trade that is being analyzed for a spike;

X2=stock price of the next trade that is used to confirm whether X1 is a spike;

Ref1 represents the reference percentage change of D1 and is also used as the reference percentage change of D3; and Ref2 represents the reference percentage change of D2.

In Step 411, D3 is compared with Ref1, and D2 is compared with Ref2. If D3 is greater than Ref1 (i.e., if the percent change in price between the next trade and the current trade is greater than the maximum allowable percentage) and D2 is less than Ref2 (i.e., the next trading price returned to a price level that is within a certain reference percentage, Ref2, of the reference trading price, so that the current trading price exhibits a spike relative to the reference trade and the next trade), it is confirmed that X1 is a price spike and is not included in the array new P( ). Flow then proceeds to Step 412. It is already known from carrying out the decision block 411 that X2 is not a price spike because D2 (the percent change in price between X2 and X0) is less than the maximum allowable percentage, Ref2. Therefore, in Step 412, X2 is added to the array new P( ), and X2 and Y2 become the new reference trade data, X0 and Y0, respectively. After Step 412, flow returns to Step 402.

If either D3 is not greater than Ref1, or D2 is not less than Ref2, X1 is not confirmed as a price spike and is added to the array new P( ) (Step 413). In Step 413, X1 and Y1 are stored in X0 and Y0, respectively, as the new reference trade data, and X2 and Y2 are stored in X1 and Y1, respectively, as the new current trade data. The spike_flag is also reset to zero. Flow then proceeds to Step 405, where D1 and Ref1 are computed based on the new reference trade data and the new current trade data.

Ref1 is derived from the following variables: (1) the stock exchange in which the stock is traded; (2) average daily trading volume of the stock (ADV); (3) the trading price of the reference trade (X0); and (4) the trading volume of the current trade (Y1). Ref2 is derived from the following variables: (1) the stock exchange in which the stock is traded; (2) average daily trading volume of the stock (ADV); (3) the trading price of the reference trade (X0); and (4) the trading volume of the current trade (Y2).

For Nasdaq trades, the initial reference percentage (Ref0) and the adjustments to the initial reference percentage based on the current volume (Y1 or Y2) and the average daily trading volume (ADV) are determined as follows:

| X0 is greater than or equal to | and X0 less than | Reference Percentage (Ref0) |
|---|---|---|
| 0.0 | 0.1 | 100% |
| 0.1 | 1.0 | 20% |
| 1.0 | 10.0 | 10% |
| 10.0 | 100.0 | 5% |
| 100.0 | | 2.5% |

| Current Volume (Y1 or Y2) is greater than or equal to | Current Volume (Y1 or Y2) is less than | Adjustment (W1) |
|---|---|---|
| 0 | 1000 | 100% |
| 1000 | 10,000 | 90% |
| 10,000 | 100,000 | 80% |
| 100,000 | 1,000,000 | 65% |
| 1,000,000 | | 35% |

| ADV is greater than or equal to | ADV is less than | Adjustment (W2) |
|---|---|---|
| 0 | 100,000 | 100% |
| 100,000 | 500,000 | 90% |
| 500,000 | 1,000,000 | 80% |
| 1,000,000 | 5,000,000 | 70% |
| 5,000,000 | 10,000,000 | 60% |
| 10,000,000 | | 40% |

For NYSE trades, the initial reference percentage (Ref0) and the adjustments to the initial reference percentage based on the current volume (Y1 or Y2) and the average daily trading volume (ADV) are determined as follows:

| X0 is greater than or equal to | and X0 less than | Reference Percentage (Ref0) |
|---|---|---|
| 0.0 | 0.1 | 100% |
| 0.1 | 1.0 | 20% |
| 1.0 | 10.0 | 10% |
| 10.0 | 100.0 | 5% |
| 100.0 | | 2.5% |

| Current Volume (Y1 or Y2) is greater than or equal to | Current Volume (Y1 or Y2) is less than | Adjustment (W1) |
|---|---|---|
| 0 | 1000 | 100% |
| 1000 | 10,000 | 90% |
| 10,000 | 100,000 | 75% |
| 100,000 | 1,000,000 | 50% |
| 1,000,000 | | 25% |

| ADV is greater than or equal to | ADV is less than | Adjustment (W2) |
|---|---|---|
| 0 | 100,000 | 100% |
| 100,000 | 500,000 | 90% |
| 500,000 | 1,000,000 | 80% |
| 1,000,000 | 5,000,000 | 70% |
| 5,000,000 | | 50% |

The reference percentages, Ref1 and Ref2, are determined from the initial reference percentage (Ref0) and the adjustments using the following equations:

$$Ref1 = Ref0 * W1 \text{(as determined using } Y1 \text{ as the current volume)} * W2; \text{ and}$$

$$Ref2 = Ref0 * W1 \text{(as determined using } Y2 \text{ as the current volume)} * W2.$$

The following tables illustrate some of the results of executing the flow diagram of FIG. 4 for stock ABCD. It is assumed for purposes of this illustration that ABCD is traded on the Nasdaq and the average daily volume of stock ABCD is 20 million shares.

The stock trading data for stock ABCD, as reported by the third party service 120, are shown in the following table. The time at which the trades took place, the trading price and the trading volume are included in the reported stock trading data. The opening price of stock ABCD corresponds to the data index i=0 and is associated with the first reported trade. All subsequent reported stock trades have data indices 1, 2, 3, etc.

| i | Time | Price | Volume |
|---|---|---|---|
| 0 | 9:30:50 AM | 30.49 | 100 |
| 1 | 9:32:01 AM | 30.70 | 500 |
| 2 | 9:32:16 AM | 30.00 | 100 |
| 3 | 9:33:55 AM | 30.21 | 2000 |
| 4 | 9:34:01 AM | 30.19 | 50 |
| 5 | 9:34:02 AM | 30.26 | 100 |
| 6 | 9:34:31 AM | 30.13 | 100 |

-continued

| i | Time | Price | Volume |
|---|------|-------|--------|
| 7 | 9:35:00 AM | 45.00 | 150 |
| 8 | 9:36:29 AM | 29.90 | 20,000 |
| 9 | 9:37:59 AM | 29.11 | 200 |
| 10 | 9:38:02 AM | 28.90 | 500 |

The following table provides a trace of the values of the variables, X0, Y0, X1, Y1, X2, Y2, D1, D2, D3, Ref1, Ref2, spike_flag, and new P( ), when the flow diagram of FIG. 4 is executed with the stock trade data from the previous table. Ref1 and Ref2 are calculated using the Nasdaq tables and the formula Ref=Ref0*W1*W2; and D1, D2 and D3 are calculated using the formulas shown above in connection with Steps 405 and 410. The new P( ) column shown below represents the stock price data array with the price spike (Price=45) removed.

| i | X0 Y0 | X1 Y1 | X2 Y2 | D1 | D2 | D3 | Ref1 | Ref2 | spike_flag | new P( ) |
|---|---|---|---|---|---|---|---|---|---|---|
| 0 | 30.49 100 | | | | | | | | 0 | 30.49 |
| 1 | | 30.70 500 | | 0.69% | | | 2.0% | | | 30.7 |
| | 30.70 500 | | | | | | | | | |
| 2 | | 30.00 100 | | 2.28% | | | 2.0% | | 1 | |
| 3 | | | 30.21 2000 | | 1.60% | 0.68% | 1.8% | | | 30 |
| | 30.00 100 | 30.21 2000 | | 0.70% | | | 1.8% | | 0 | 30.21 |
| | | 30.21 2000 | | | | | | | | |
| 4 | | 30.19 50 | | 0.07% | | | 2.0% | | | 30.19 |
| | 30.19 50 | | | | | | | | | |
| 5 | | 30.26 100 | | 0.23% | | | 2.0% | | | 30.26 |
| | 30.26 100 | | | | | | | | | |
| 6 | | 30.13 100 | | 0.43% | | | 2.0% | | | 30.13 |
| | 30.13 100 | | | | | | | | | |
| 7 | | 45.00 150 | | 49.35% | | | 2.0% | | 1 | |
| 8 | | | 29.90 20000 | | 0.76% | 50.12% | | 1.6% | 0 | 29.9 |
| | 29.90 20000 | | | | | | | | | |
| 9 | | 29.11 200 | | 2.64% | | | 2.0% | | 1 | |
| 10 | | | 28.90 500 | | 3.34% | 0.70% | 2.0% | | 0 | 29.11 |
| | 29.11 200 | 28.90 500 | | 0.72% | | | 2.0% | | | 28.9 |

As shown above, when i=2, D1 (2.28%) is greater than Ref1 (2.0%), and thus X1=30.00 is identified as a potential price spike (spike_flag=1). However, X1=30.00 is not confirmed as a price spike during i=3, because D3 (0.68%) is less than Ref1 (2.0%), and thus, X1 is included in the array new P( ).

In contrast, X1=45.00 is confirmed as a price spike and is not included in the array new P( ). This is because, when i=7 and X1=45.00, D1 (49.35%) is greater than Ref1 (2.0%), identifying X1=45.00 as a potential price spike; and D2 (0.76%) is less than Ref2 (1.6%) and D3 (50.12%) is greater than Ref1 (2.0%), confirming X1=45.00 as a price spike during i=8.

While the foregoing is directed to embodiments of the present invention, other and further embodiments of the invention may be devised without departing from the basic scope thereof, and the scope thereof is determined by the claims that follow.

What is claimed is:

1. A method of testing a reliability of information relating to transactions by a processor involving a particular security for providing accurate information to a user, the method comprising:

receiving, by a first processor, a time series of discrete values representative of the transactions, wherein the time series of discrete values includes a discrete value, a previous discrete value, and a subsequent discrete value, each associated with a time, and wherein the time associated with the previous discrete is earlier relative to the time associated with the discrete value, and the time associated with the subsequent discrete value is later relative to the time associated with the discrete value;

identifying, by the first processor, the received discrete value as potentially unreliable by comparing the received discrete value with the previous discrete value in the time series;

determining, by a second processor, a spike size measure of the received discrete value when the subsequent discrete value in the time series is received, wherein the spike size measure determines reliability of the received value, and determining a spike size measure of the received discrete value comprises:

comparing a difference between the subsequent discrete value and the received discrete value with a first reference value;

comparing a difference between the subsequent discrete value and the previous discrete value with a second reference value; and comparing a percentage difference in value between the previous discrete value and the received discrete value with a reference percentage; and dynamically filtering, by the second processor, the information relating to transactions based upon the determined spike size measure for providing to a user, such that the discrete value is filtered to not be provided to the user if the received discrete value is determined to be unreliable based on the spike size measure.

2. The method according to claim 1, wherein the previous discrete value, the received discrete value and the subsequent discrete value represent three successive discrete values in the time series.

3. The method according to claim 1, wherein the reference percentage depends on an average daily trading volume of the particular security.

4. A computer-implemented method of identifying unreliable financial information for filtering the financial information for providing to a user, the method comprising:

receiving a time series of discrete values representative of the transactions, wherein the time series of discrete values includes a discrete value, a previous discrete value, and a subsequent discrete value, each associated with a time, and wherein the time associated with the previous discrete is earlier relative to the time associated with the discrete value, and the time associated with the subsequent discrete value is later relative to the time associated with the discrete value;

identifying the received discrete value as potentially unreliable by comparing the received discrete value with the previous discrete value in the time series;

determining a spike size measure of the received discrete value when the subsequent discrete value in the time series is received, wherein the spike size measure determines reliability of the received value, and determining a spike size measure of the received discrete value comprises:

comparing a difference between the subsequent discrete value and the received discrete value with a first reference value;

comparing a difference between the subsequent discrete value and the previous discrete value with a second reference value; and comparing a percentage difference in value between the previous discrete value and the received discrete value with a reference percentage; and dynamically filtering, by the second processor, the information relating to transactions based upon the determined spike size measure for providing to a user, such that the discrete value is filtered to not be provided to the user if the received discrete value is determined to be unreliable based on the spike size measure.

5. The method according to claim 4, wherein the financial data at the second point in time is designated as unreliable if:

a percent change in the second value from the first value relative to the first value is greater than a first reference percentage;

a percent change in the third value from the second value relative to the first value is greater than a second reference percentage; and a percent change in the third value from the first value relative to the first value is not greater than a third reference percentage.

6. The method according to claim 5, wherein the first and second reference percentages are equal.

7. The method according to claim 4, wherein the financial data comprises a trading price of a particular security at a point in time, and each of the comparisons is made with respect to a reference percentage.

8. The method according to claim 7, wherein the reference percentage depends on an average daily trading volume of the particular security.

9. The method according to claim 8, wherein the reference percentage further depends on a trading price included in the financial data at the first point in time.

10. The method according to claim 4, further comprising:

storing a fourth value representative of financial data at a fourth point in time that follows the third point in time; and if the financial data at the second point in time is designated as unreliable, designating the financial data at the third point in time as unreliable based on comparisons of the third value with the first value, the fourth value with the third value, and the fourth value with the first value.

11. The method according to claim 10, wherein the financial data at the third point in time is designated as unreliable if:

a percent change in the third value from the first value relative to the first value is greater than a first reference percentage;

a percent change in the fourth value from the third value relative to the first value is greater than a second reference percentage; and a percent change in the fourth value from the first value relative to the first value is not greater than a third reference percentage.

12. The method according to claim 10, wherein the financial data comprises a trading price of a particular security at a point in time, and each of the comparisons is made with respect to a reference percentage that depends on an average daily trading volume of the particular security.

13. A computer system for presenting financial information to a user, comprising:

a memory for storing instructions; and a first data processing section in communication with a second data processing section for executing the instructions, the instructions comprising instructions for:

receiving a time series of discrete values representative of the transactions, wherein the time series of discrete values includes a discrete value, a previous discrete value, and a subsequent discrete value, each associated with a time, and wherein the time associated with the previous discrete is earlier relative to the time associated with the discrete value, and the time associated with the subsequent discrete value is later relative to the time associated with the discrete value;

identifying the received discrete value as potentially unreliable by comparing the received discrete value with the previous discrete value in the time series;

determining a spike size measure of the received discrete value when the subsequent discrete value in the time series is received, wherein the spike size measure determines reliability of the received value, and determining a spike size measure of the received discrete value comprises:
  comparing a difference between the subsequent discrete value and the received discrete value with a first reference value;
  comparing a difference between the subsequent discrete value and the previous discrete value with a second reference value; and
  comparing a percentage difference in value between the previous discrete value and the received discrete value with a reference percentage; and
  dynamically filtering, by the second processor, the information relating to transactions based upon the determined spike size measure for providing to a user, such that the discrete value is filtered to not be provided to the user if the received discrete value is determined to be unreliable based on the spike size measure.

14. The computer system according to claim 13, further comprising a third data processing section in communication with the user and configured to receive a request for financial information from the user and pass on the request to the second data processing section.

15. The computer system according to claim 14, wherein the second data processing section is configured to compare a first of the three successive trading prices with a second of the three successive trading prices, the first of the three successive trading prices with a third of the three successive trading prices, and the second of the three successive trading prices with the third of the three successive trading prices.

16. The computer system according to claim 15, wherein the second data processing section is configured to exclude the second price of the three successive trading prices in the financial information delivered to the user if:
  a difference in the first of the three successive trading prices and the second of the three successive trading prices is greater than a first reference value;
  a difference in the second of the three successive trading prices and the third of the three successive trading prices is greater than a second reference value; and
  a difference in the first of the three successive trading prices and the third of the three successive trading prices is not greater than a third reference value.

17. The computer system according to claim 14, wherein the financial information is delivered to the user in graph form.

18. The computer system according to claim 14, wherein the third processing section is further configured to generate an e-mail alert based on the financial information.

19. A computer-readable medium encoded with executable instructions for a processor, the instructions for:
  receiving, by a first processor, a time series of discrete values representative of the transactions, wherein the time series of discrete values includes a discrete value, a previous discrete value, and a subsequent discrete value, each associated with a time, and wherein the time associated with the previous discrete is earlier relative to the time associated with the discrete value, and the time associated with the subsequent discrete value is later relative to the time associated with the discrete value;
  identifying, by the first processor, the received discrete value as potentially unreliable by comparing the received discrete value with the previous discrete value in the time series;
  determining, by a second processor, a spike size measure of the received discrete value when the subsequent discrete value in the time series is received, wherein the spike size measure determines reliability of the received value, and determining a spike size measure of the received discrete value comprises:
  comparing a difference between the subsequent discrete value and the received discrete value with a first reference value;
  comparing a difference between the subsequent discrete value and the previous discrete value with a second reference value; and
  comparing a percentage difference in value between the previous discrete value and the received discrete value with a reference percentage; and
  dynamically filtering, by the second processor, the information relating to transactions based upon the determined spike size measure for providing to a user, such that the discrete value is filtered to not be provided to the user if the received discrete value is determined to be unreliable based on the spike size measure.

* * * * *